United States Patent [19]

Klein et al.

[11] Patent Number: 4,830,648
[45] Date of Patent: May 16, 1989

[54] METHOD OF MAKING A UNITARY TUBULAR GENERALLY U-SHAPED DISCHARGE VESSEL, PARTICULARLY FOR COMPACT FLUORESCENT LAMPS

[75] Inventors: Lutz Klein; Ernst Panofski, both of Augsburg, Fed. Rep. of Germany

[73] Assignee: Patent Treuhand Gesellschaft Elektrische Gluhlampen m.b.h., Munich, Fed. Rep. of Germany

[21] Appl. No.: 238,460

[22] Filed: Aug. 30, 1988

[30] Foreign Application Priority Data

Sep. 4, 1987 [DE] Fed. Rep. of Germany ....... 3729710

[51] Int. Cl.⁴ ............................................. C03B 23/06
[52] U.S. Cl. ......................................... 65/54; 65/108; 65/110; 65/276; 65/281
[58] Field of Search ..................... 65/54, 55, 108, 110, 65/276, 280, 281, 286

[56] References Cited

U.S. PATENT DOCUMENTS

| | | | |
|---|---|---|---|
| 4,288,239 | 9/1981 | Hoeh | 65/110 |
| 4,319,162 | 3/1982 | Hoeh | 313/487 |
| 4,422,863 | 12/1983 | Hosoya et al. | 65/110 |
| 4,433,994 | 2/1984 | Fujimura et al. | 65/108 |
| 4,481,442 | 11/1984 | Albrecht et al. | 313/493 |

Primary Examiner—Arthur Kellogg
Attorney, Agent, or Firm—Frishauf, Holtz, Goodman & Woodward

[57] ABSTRACT

To prevent weakened corners when forming a U-shaped discharge tube with sharp corners (28, 29) during a bending operation from a straight tube, two glass tubes (1, 3) having a wall dimension suitable for a compact fluorescent tube are fused to a central tubular glass element (2) of thicker wall dimension so that, upon bending into U-shape with sharp corners (28, 29), the thicker wall portion can stretch and form the essentially right-angle corners of requisite wall thickness. Preferably, during the heating steps for forming the glass, the initially straight glass portions (1, 2, 3) are rotated.

7 Claims, 2 Drawing Sheets

METHOD OF MAKING A UNITARY TUBULAR GENERALLY U-SHAPED DISCHARGE VESSEL, PARTICULARLY FOR COMPACT FLUORESCENT LAMPS

Reference to related patents, the disclosure of which is hereby incorporated by reference: U.S. Pat. No. 4,481,442, ALBRECHT et al assigned to the assignee of the present application. U.S. Pat. No. 4,288,239, HOEH; U.S. Pat. No. 4,319,162, HOEH.

The present invention relates generally to compact fluorescent lamps, and more particularly to a method of making a unitary discharge vessel for such lamps, which has a U-shaped bend so that two legs of the U are parallel to each other, and in which the corners of the U-shaped bend are essentially squared-off corners to provide heat dissipation zones to provide "cold spots" to ensure optimal lamp operation.

BACKGROUND

U.S. Pat. No. 4,481,442, ALBRECHT, HOFMANN, KLEIN and PANOFSKI, assigned to the assignee of the present application, the disclosure of which is hereby incorporated by reference, discloses a glass vessel for use as a compact fluorescent tube, and a method to make such a vessel. A generally straight glass tube forms the starting material. The portions of the tube which are to be bent are heated to softening temperature. By then bending the unheated tube portions against each other, a 180° bend is formed. The bent portion is introduced into a mold and compressed air is blown into the ends of the tube, so that the bent portion will then receive the shape of the mold. The bent portions form, essentially, right-angle corners which are used as cold spots to ensure optimal operation of the lamp by appropriately controlling the gas pressure within the lamp during operation thereof.

U.S. Pat. Nos. 4,288,239 and 4,319,162 describe a method to manufacture discharge lamps which are formed with multiple bends. An essentially straight glass tube is heated, at appropriate regions, until it softens and the non-heated portions are then bent about a mandrel or shaping form or die so that the discharge vessel will receive the desired shape. The bends form generally curved portions and do not have sharp corners which can provide cold spots.

The wall thickness of the glass tube, it has been found, decreases at the essentially square corners formed by the bending and subsequent molding in order to obtain the shape of the vessel described in the referenced U.S. Pat. No. 4,481,442. Bending the tube alone already decreases the wall thickness and when making the essentially square corners, the wall thickness decreases further. It has been found that due to the thin remaining glass wall, lamps of this type are subject to breakage at the bent corners.

Breakage at the bent corners can be prevented by making the glass of the glass tube already with a sufficient thickness so that, after forming the 180° bend, a predetermined minimum thickness will remain even at the bent corners. This, however, substantially increases the weight of the overall discharge vessel, and its cost.

THE INVENTION

It is an object to provide a method to make a bent discharge vessel which has one or more bent portions, in which the wall thickness in the region of the bends, and particularly in the outer regions of the bends, does not decrease beyond a predetermined minimum wall thickness while, however, the wall thickness of the remainder of the discharge vessel does not increase beyond a dimension which is compatible with the dimension at the corners, so that, overall, the lamp will not weigh substantially more than lamps having a decreased wall thickness at the corners.

Briefly, a central portion of glass tube of increased wall thickness is joined to two extending leg portions having normal fluorescent lamp tube wall thickness. The bend is then made in the region of the central glass portion of increased wall thickness so that, when the bend is effected, and upon stretching of the glass due to bending, the wall thickness at the bent corner will be reduced to a desired wall thickness only, and commensurate, at least approximately, with the wall thickness of the glass tubes of which, normally, fluorescent lamps are made.

In accordance with a feature of the invention, two tubular glass elements, and having a wall thickness corresponding to a predetermined thickness of leg portions of the lamp discharge vessel, are aligned with a third tubular glass element having a wall thickness greater than this predetermined thickness. The end portions of adjacent, aligned glass elements are then heated to melting temperature, and the melted end portions are melted together to form a unitary sub-part having the two tubular glass portions of predetermined thickness at the ends and the central portion of greater thickness in the middle. The central portion is heated to softening temperature, or not permitted to cool beyond softening temperature, and bent into a bent portion to form a 180° bend by moving together the end leg portions until they are essentially parallel to each other. The so formed bent part can be placed in a mold, compressed air blown thereinto, and the corners characteristic of the structure of the referenced U.S. Pat. No. 4,481,442, ALBRECHT et al, formed with the wall thickness of the glass at the corners being at least roughly equivalent to the predetermined wall thickness of the leg portions of the discharge vessel.

The method has the advantage that a straight unitary sub-part glass tube is formed having greater wall thickness in just that region where the bend is to be made. This makes it possible to form the discharge vessel in such a manner that it will not have any portions which are weaker than others so as to introduce regions which are more subject to breakage due to a thinner wall. The transition between the regions with different wall thicknesses on the straight glass tube becomes particularly uniform if the various portions of tubes are rotated about their longitudinal axes—when they are aligned—upon heating of the ends to melt them together. The essentially right-angle corners are formed after introduction of compressed air into the mold to form cold spots which control the gas pressure in the discharge vessel, and hence the light output obtainable from the fluorescent lamp during operation thereof.

Drawings, illustrating, in sequential steps, the process of making the discharge vessel:

FIGS. 1 through 5 illustrate, in schematic longitudinal axial view, sequential steps in the making of a U-shaped discharge vessel.

DETAILED DESCRIPTION

Figure 1:
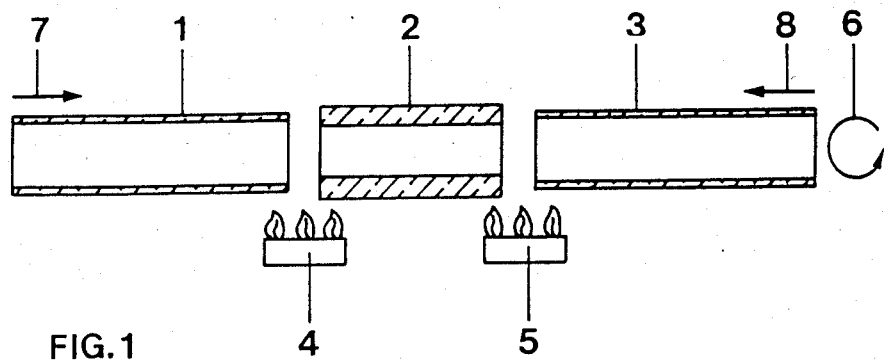

Three straight pieces of glasses 1, 2, 3 (see FIG. 1) of circular cross section are placed in alignment with each other. The two outer glass elements 1 and 3 have a wall thickness which is suitable for the straight portions 28', 29' (FIG. 5) of a U-shaped discharge vessel with essentially square corners. In accordance with a feature of the invention, the central glass part 2 has a greater wall thickness. The central part 2 is that portion which, when the discharge vessel is finished (see FIG. 5), will form the bends at the corners 28, 29 and provide a cross connecting portion 2829.

In accordance with a feature of the present invention, two heaters, for example gas burners 4, 5, heat adjacent ends of the glass parts 1, 2, 3 to softening temperature. Preferably, and to obtain uniform heating with a gas flame, the three glass parts 1, 2, 3 are rotated about their longitudinal axes, as schematically illustrated by the arrow 6. When the ends of the glass parts 1, 2, 3 are sufficiently soft, glass parts 1 and 3 are moved towards the glass part 2, as schematically shown by arrows 7, 8, so that the softened ends of the glass parts will melt or fuse together.

Figure 2:
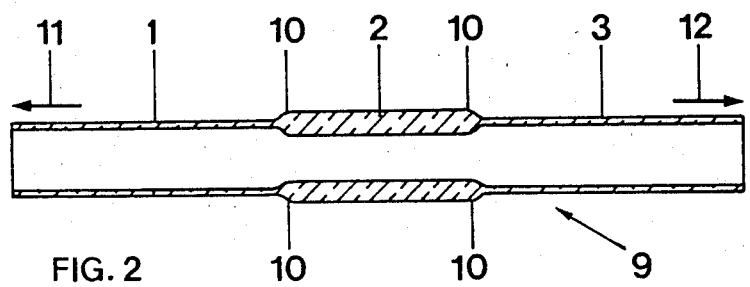
Figure 3:
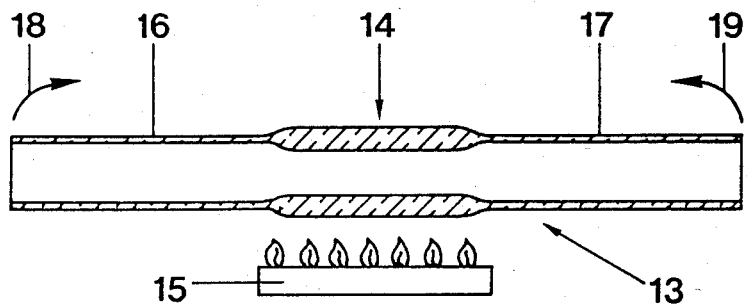

The result, upon melting or fusion of the glass parts, is shown in FIG. 2. The composite sub-part 9, now formed by the original separate glass parts 1, 2, 3, is a unitary element. While the glass parts are still warm, they are somewhat pulled apart, as schematically shown by the arrows 11, 12 in order to remove beads 10 which form at the junction point of the melted-together glass parts 1 and 3 with the central part 2. The result will be a glass tube 13 (FIG. 3) having uniform transition between the outer thinner regions 16, 17 and the central thickened region 14.

Figure 4:
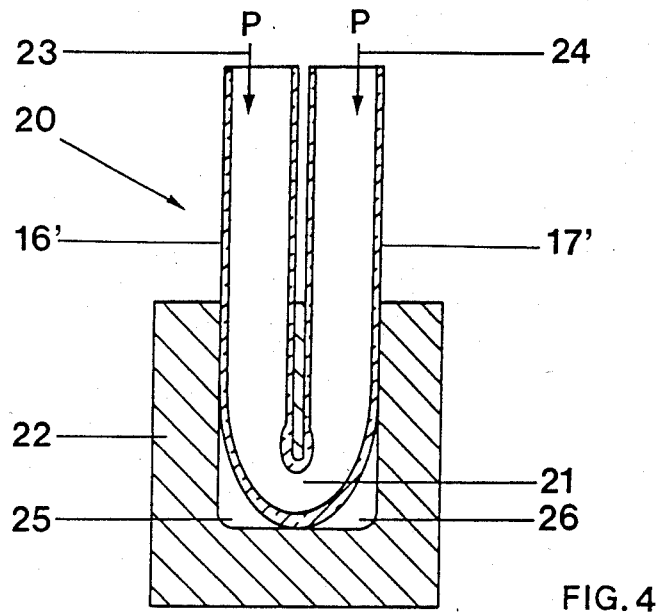
Figure 5:
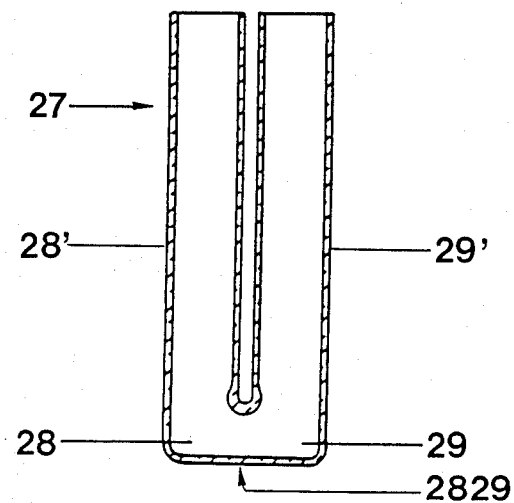

A heater, typically a gas burner 15, is then used to uniformly heat the part 13. The sub-part 13, during heating by the burner 15, may also be rotated about its longitudinal axis, similar to the rotation schematically shown by the arrow 6 (FIG. 1). When the central part 14 is soft, the two thinner wall portions 16, 17 are bent towards each other as schematically shown by arrows 18, 19 to form a generally U-shaped 180° bend in the glass tube 13. After bending, and as shown in FIG. 4, the bent glass tube 20, having the 180° U-shaped bend 21, is introduced into a metal die 22. Compressed air is introduced into the leg portions 16', 17' of the bent tube 20, as schematically shown by the arrows 23, 24, to provide a compressed air force P in the interior of the glass tube 20. This forces the still soft glass of the glass tube 20 to assume the shape of the die 22 and press the glass into the essentially right-angle corners 25, 26 of the die 22. The finished discharge vessel 27, with leg portions 28', 29', cross-connecting portion 2829, and corners 28, 29, can be removed from the die 22. It is shown in FIG. 5.

The wall thickness of the walls at the corners 28, 29 will be at least roughly commensurate with the wall thickness of the leg portions 28', 29' and, preferably, the essentially or substantially the same. Thus, danger of breakage due to the comparatively sharp corners 28, 29, forming cold spots for the lamp, is essentially avoided.

Various changes and modifications may be made within the scope of the inventive concept.

We claim:

1. A method of making a unitary tubular, generally U-shaped discharge vessel, formed with a 180° bend, for a low-pressure discharge lamp, having two parallel leg portions (28', 29') and a cross-connecting portion (2829) integral with said leg portions and connecting said leg portions with two essentially right-angle bends to form the 180° bend, comprising the steps of aligning two tubular glass elements (1, 3) having a wall thickness corresponding to a predetermined thickness of the leg portions (28', 29') of the discharge vessel and a third tubular glass element (2) having a wall thickness greater than said predetermined thickness, with said third tubular glass element placed intermediate said two tubular glass elements;

heating the end portions of adjacent, aligned glass elements to fusing temperature;

melting or fusing together said end portions to form a unitary sub-part (9) having said two tubular glass portions of predetermined wall thickness and a central portion of greater wall thickness;

heating said central portion to softening temperature; and bending said two tubular glass portions of predetermined wall thickness towards each other until they are essentially parallel to form said unitary discharge vessel having said 180° bend.

2. The method of claim 1, including the step of rotating the two tubular glass elements (1, 3) and said third tubular glass element (2) about their longitudinal axes during said step of heating the end portions of said glass elements.

3. The method of claim 1, further including the step of introducing said unitary sub-part (20), with said central portion being heated to softening temperature, into a die (22) having essentially right-angle interior corners (25, 26);

and introducing compressed air into open ends of said two tubular glass elements forming said two parallel leg portions (28', 29') to extend the central portion into said essentially right-angle corners of the die and to form essentially right-angle corners (28, 29) in the discharge vessel.

4. The method of claim 3, including the step of rotating the two tubular glass elements (1, 3) and said third tubular glass element (2) about their longitudinal axes during said step of heating the end portions of said glass elements.

5. The method of claim 1, further including the step of drawing-apart said two tubular glass elements for a slight distance after fusing together the melted end portions to remove beads (10) at the fusion points of the two tubular glass elements (1, 3) with said third tubular glass element (2).

6. The method of claim 5, including the step of rotating the two tubular glass elements (1, 3) and said third tubular glass element (2) about their longitudinal axes during said step of heating the end portions of said glass elements.

7. The method of claim 6, further including the step of introducing said unitary sub-part, with said central portion being heated to softening temperature, into a die (22) having essentially right-angle interior corners (25, 26);

and introducing compressed air into open ends of said two tubular glass elements forming said two parallel leg portions (28', 29') to extend the central portion into said essentially right-angle corners of the die and to form essentially right-angle corners (28, 29) in the discharge vessel.

* * * * *